US010024634B2

(12) United States Patent
Kempas et al.

(10) Patent No.: US 10,024,634 B2
(45) Date of Patent: Jul. 17, 2018

(54) GROUND-BASED ANTI-AIRCRAFT SYSTEM AND METHOD FOR OPERATING THE SYSTEM

(71) Applicant: DIEHL DEFENCE GMBH & CO. KG, Ueberlingen (DE)

(72) Inventors: Thorsten Kempas, Ueberlingen (DE); Ralf Lange, Pforzheim (DE); Michael Masur, Ueberlingen (DE); Thomas Drexler, Owingen (DE); Bernd Lindenau, Ravensburg (DE); Andre Selz, Ueberlingen (DE); Rainer Schulze, Owingen (DE)

(73) Assignee: Diehl Defence GmbH & Co. KG, Ueberlingen (DE)

( * ) Notice: Subject to any disclaimer, the term of this patent is extended or adjusted under 35 U.S.C. 154(b) by 487 days.

(21) Appl. No.: 14/714,502

(22) Filed: May 18, 2015

(65) Prior Publication Data

US 2016/0047633 A1 Feb. 18, 2016

(30) Foreign Application Priority Data

May 17, 2014 (DE) ......................... 10 2014 007 308

(51) Int. Cl.
*G05B 13/02* (2006.01)
*G06F 17/00* (2006.01)
(Continued)

(52) U.S. Cl.
CPC ............... *F41H 11/02* (2013.01); *F41G 3/04* (2013.01); *F41G 7/007* (2013.01); *G05B 15/02* (2013.01)

(58) Field of Classification Search
CPC .... G06F 17/30179; H04Q 2213/13204; H04Q 2213/13527
(Continued)

(56) References Cited

U.S. PATENT DOCUMENTS 4,553,493 A 11/1985 Sadler et al.
4,641,801 A 2/1987 Lynch, Jr. et al.
(Continued)

FOREIGN PATENT DOCUMENTS

DE 41 31 909 A1 4/1993
DE 101 17 007 A1 10/2002
(Continued)

OTHER PUBLICATIONS

RFC 791—Internet Protocol (DARPA Internet Program, Protocol Specification, Sep. 1981, prepared for Defense Advance Research Project Agency, Arlington, VA by Information Sciences Institute University of Southern California.
(Continued)

*Primary Examiner* — Michael J Brown
(74) *Attorney, Agent, or Firm* — Laurence A. Greenberg; Werner H. Stemer; Ralph E. Locher (57) ABSTRACT

A method for operating a ground-based anti-aircraft system includes providing a group of main system components containing a sensor system, a tactical operation control and an effector system. Combat target sensor data are passed from the sensor system to the tactical operation control, processed therein and passed in processed form from the tactical operation control to the effector system, using the data to combat the target. A central integration module having a converter unit and a central data distributor allows differently constructed main system components to be connected. Data from all main system components are routed to the central data distributor by the converter unit and converted therein from component protocol into system-internal data protocol, and passed from the central data distributor to one or more main system components, through the converter unit, converting the distributed data back from system-internal data protocol into component protocol.

10 Claims, 1 Drawing Sheet

(51) Int. Cl.
 *F41H 11/02* (2006.01)
 *F41G 3/04* (2006.01)
 *G05B 15/02* (2006.01)
 *F41G 7/00* (2006.01)
(58) Field of Classification Search
 USPC .............................................. 700/90, 112, 29
 See application file for complete search history.

(56) References Cited

U.S. PATENT DOCUMENTS

| | | | |
|---|---|---|---|
| 8,812,374 B1* | 8/2014 | Sriram | H04N 21/2542 |
| | | | 705/1.1 |
| 9,250,043 B1* | 2/2016 | Block | F41H 11/02 |
| 2002/0149510 A1 | 10/2002 | Salzeder | |
| 2004/0021033 A1 | 2/2004 | Redano | |
| 2005/0131933 A1 | 6/2005 | Jha | |
| 2008/0120373 A1 | 5/2008 | Donovan et al. | |
| 2012/0316819 A1 | 12/2012 | Martell et al. | |
| 2013/0145203 A1* | 6/2013 | Fawcett | G06F 9/30007 |
| | | | 714/3 |

FOREIGN PATENT DOCUMENTS

| | | |
|---|---|---|
| DE | 102007007404 A1 | 8/2008 |
| EP | 0097192 B1 | 9/1987 |
| JP | 2008224195 A | 9/2008 |
| WO | 2008098561 A1 | 8/2008 |
| WO | 02071249 A2 | 9/2009 |

OTHER PUBLICATIONS

Internet Group Management Protocol—Wikipedia (German and English Version).

Marcel Tschöpe, "IP-Multicast, Die Funktionsweise von IP-Multicast", Albert-Ludwigs-Universitaet Freiburg, Institut fuer Informatik, Jan. 2008—English abstract.

IPCOMM GmbH, "Kommunikation, die verbindet", brochure, Apr. 2013.

Ekey biometric systems GmbH, "Ekey converter UDP", brochure, Sep. 2012.

* cited by examiner

GROUND-BASED ANTI-AIRCRAFT SYSTEM AND METHOD FOR OPERATING THE SYSTEM

CROSS-REFERENCE TO RELATED APPLICATION

This application claims the priority, under 35 U.S.C. § 119, of German Patent Application DE 10 2014 007 308.4, filed May 17, 2014; the prior application is herewith incorporated by reference in its entirety.

BACKGROUND OF THE INVENTION

Field of the Invention

The invention relates to a method for operating a ground-based anti-aircraft system having a group of main system components that contains a sensor system, a tactical operation control and an effector system, in which sensor data about a target for combat are passed from the sensor system to the tactical operation control, are processed therein and are passed in processed form from the tactical operation control to the effector system, which uses the data to combat the target.

A ground-based anti-aircraft system is used for combating aircraft from the ground. To this end, the anti-aircraft system usually includes a sensor system having a sensor, a tactical operation control and an effector system. The sensor system, usually a radar system on a truck, senses the aircraft by using a sensor device and determines direction data and speed data for the aircraft. Those data are forwarded from the sensor system to the tactical operation control, which controls the effector system. The effector system usually includes one or more effector units. By way of example, the effector system has a launcher device disposed on a truck, which launcher device contains a plurality of effector units in the form of anti-aircraft missiles that are stored in canisters. The anti-aircraft missiles are started by the tactical operation control and steered by the tactical operation control and/or the sensor system in the direction of the target for combat.

A tactical operation control (TOC) usually includes a central control unit that may include a so-called sensor fire and weapon control (SFWC). Furthermore, a tactical operation control may contain a fire control station that can accept user inputs or external information from a further command post or another control station. The tactical operation control is connected to the other main system components, that it to say to the sensor system and to the effector system, and controls the battle operations centrally.

SUMMARY OF THE INVENTION

It is accordingly an object of the invention to provide a ground-based anti-aircraft system and a method for operating the system, which overcome the hereinafore-mentioned disadvantages of the heretofore-known systems and methods of this general type and which are suitable for operation with main system components from different manufacturers.

With the foregoing and other objects in view there is provided, in accordance with the invention, a method for operating a ground-based anti-aircraft system having a group of main system components that contains a sensor system, a tactical operation control and an effector system, in which sensor data about a target for combat are passed from the sensor system to the tactical operation control, are processed therein and are passed in processed form from the tactical operation control to the effector system, which uses the data to combat the target. A central integration module having a converting unit and a central data distributor is provided, the data from all main system components are routed to the central data distributor by the converter unit in each case, are converted from a component protocol into a system-internal data protocol in the converter unit, and are passed from the central data distributor to one or more main system components, again through the converter unit, with the converter unit converting the distributed data back from the system-internal data protocol into a component protocol.

The invention is based on the consideration that standard ground-based anti-aircraft systems have a monolithic structure, since the complexity of the main system components means that the latter are usually fitted with control components by a single manufacturer and the control components are controlled by the tactical operation control. If a main system component needs to be replaced, it is also necessary for the tactical operation control to be reprogrammed, possibly to a great depth. That can reduce system integrity, that is to say the certainty that the system will work under all circumstances.

The invention provides for a central integration module to be provided in addition to the main system components. The central module makes it easier for the main system components to be connected to one another. The central integration module is used to standardize the data coming from the main system components and to change the data sent to the main system components from the standardized form into the component form. In particular, the standardization includes changing from a component protocol to a central protocol.

Expediently, data from all main system components are routed to the central data distributor by the converter unit in each case, are converted from a component protocol into a system-internal data protocol in the converter unit, and are passed from the central data distributor to one or more main system components, again through the converter unit, with the converter unit converting the distributed data back from the system-internal data protocol into a component protocol.

The central integration module advantageously includes a converter unit and a central data distributor and is used in the manner of a programming shield to require alterations in the programming to be made only in the converter unit. Core functions that are intended for controlling the tactical operations can remain untouched, since data that are output from the converter unit to the inside are independent of the type of protocol of the main system components. Specific component peculiarities of the main system components in terms of their programming, that is to say of a data protocol and particularly of a data format and the like, can be picked up in the actual converter unit and inwardly standardized, so that expediently only standardized data are distributed inwardly, that is to say in the direction of the other main system components and the core functions. Such standardization can be oriented to military standards, for example Link 16, or industrial standards. In this way, it is possible for main system components from different manufacturers to be connected to one another to form a ground-based anti-aircraft system without the need for central functions to be altered and without adversely affecting system integrity.

A sensor system is subsequently understood to mean a system having one or more sensors that sense at least position data about an air target for combat by using a sensor device and provide the data through a sensor interface.

A tactical operation control can be understood to mean a unit that performs tactical control of the effector system and particularly also of the sensor system. It contains particularly a central control unit for controlling the other main system components, for example a so-called sensor fire and weapon control. The tactical operation control passes combat deployment data to the central integration module, for example. There, the data are processed and passed in processed form from the central integration module to the sensor system. The sensor system can use the combat deployment data to sense the target and to produce target data and forward the target data to the central integration module.

An effector system is a system having at least one effector unit for combating an aircraft, for example an anti-aircraft missile. Expediently, the effector system also includes a starter for starting the effector unit, for example a canister having an integrated firing apparatus for the effector unit stored in the canister, and particularly also a launcher device for moving the canisters. A loading unit for loading a canister with an, or, depending on the embodiment of the canister, with a plurality of, effector unit(s) may also be part of the effector system. However, a loading unit can also be understood to mean a further main system component, which may likewise be connected centrally to the integration module.

The central integration module may be connected to a main system component locally, for example it may be integrated in a vehicle that includes the tactical operation control and/or the sensor system. In addition to the pure standardization function, it may also contain core functions that are used for tactical control of the ground-based anti-aircraft system. The converter unit is a shield that is basically interposed between the main system components and the central data distributor. Core functions may also be connected to the central data distributor, as a result of which data between the core functions and the main system components must always pass through the converter unit.

The main system components basically include a system interface for outputting data compiled in the main system component, for example sensor data, and for accepting commands for performing work processes. These component interfaces are prepared for communication with a component protocol that the manufacturer has stipulated and has described for incorporation into other systems. The component protocols may differ from manufacturer to manufacturer. By way of example, when the OSI model is taken as a basis, the component protocols of main system components from different manufacturers may differ from one another, particularly in the layers above the transport layer, such as in the application layer, for example. These different component protocols are converted into a single system-internal data protocol, as a result of which the data routed to the central data distributor are passed to the central data distributor in the system-internal data protocol, regardless of the main system component from which they come. This system-internal data protocol may be a generic messaging system that thus has general validity for all data lines from and to the main component systems.

In accordance with another advantageous mode of the method of the invention, the converter unit has a dedicated converter element for each main system component, the converter element converting the data from and to its main system component. The converter element may be a hardware component or just a software component that expediently converts just the data from and to their main system component. There is thus advantageously just one and precisely one converter element provided for each main system component, the converter element being associated with the main system component. If a main system component is swapped and replaced by another, it is sufficient to swap just that converter element of the converter unit that is responsible for this main system component. All other hardware and/or software components can remain unchanged. Each converter element may include one matching element and one connecting element that are provided as isolated elements, and possibly just programmed as such. In addition, each converter element may be prepared to register with the central data distributor for the data that their associated main system component requires.

Each main system component needs to be controlled in order to be able to perform the operations assigned to it. This requires a control function that converts operational commands, for example from the tactical operation control, into control commands for another main system component. This control is expediently undertaken by the converter unit of the central integration module. In this case, the inputs, such as tactical commands from the tactical operation control, come from the central data distributor and are converted into component-related control commands for controlling the main system component in the converter unit.

In accordance with a further advantageous mode of the method of the invention, the converter unit isolates control data and operational data that are present in the data stream from a main system component from one another and forwards only the operational data to the central data distributor. The data from and to a main system component usually contain operational data, that is to say data that are relevant to ground-to-air target combat, such as position, range and speed of a target for combat, and control data that are used for controlling the main system component, such as instructions pertaining to the mode of operation of the main system component, so-called heartbeat data, or data pertaining to connection set-up, connection clear-down, login or the like. Normally, control data from and to a main system component are irrelevant to the other main system components. In this respect, it is advantageous for the control data to be isolated from the operational data that are intended for another main system component and are processed by the latter, so that the central data distributor actually contains only data or operational data that need to be distributed further. In this way, it is possible for a data structure to be simplified and transmission errors can be decreased.

The operational data delivered by a main system component may be in a data format that cannot usefully be processed by another main system component. By way of example, a situation may arise in which the sensor system indicates direction data in an internal reference system or coordinate system that is unknown to the other main system component, however. Units of measure may also differ, so that a range or speed indication is delivered or required in different units of measure for example. In accordance with an added advantageous mode of the method of the invention, in order to make such different component formats compatible with one another, it is proposed that the converter unit converts operational data received from a main system component from a component format, that is to say a format that is inherent to the main component, into a system-internal data format and forwards them to the central data distributor in this format. The central data distributor can then provide the operational data for another main system component. The component format thereof may differ from the system-internal data format. In this case, the converter unit converts the operational data from the system-internal data format back into the component format that is inherent to the main component that is intended to receive the operational data.

Operational data from a main system component can be provided for all other main system components, including those that do not need the data. In accordance with an additional advantageous mode of the method of the invention, in the case of this type of data distribution, it is advantageous if the converter unit filters the data that are relevant to a main system component from the data that are provided in the central data distributor generally.

Similarly, it is possible for the central data distributor to recognize that main system component from which incoming operational data come. Expediently, the central data distributor includes a list that contains which operational data are needed by which main system component. In accordance with yet another advantageous mode of the method of the invention, the central data distributor may have an addressing and distribution unit in which the operational data accepted and converted from one main system component are addressed to another main system component. The relevant main system components, or the converter elements of the converter unit that are connected upstream thereof, are thus automatically provided with the data that they need or have requested.

It is also possible for the central data distributor to recognize that class with which incoming operational data can be associated. Expediently, the central data distributor includes a registration unit that interacts with an addressing and distribution unit and in which a converter element of the converter unit, which converter element is connected upstream of a main system component, can register for one or more classes of operational data that the main system component needs. The data distributor is expediently constructed in such a way that as soon as it receives incoming operational data in a class it uses the registration unit to check which converter elements have registered for this class of operational data and automatically forwards the operational data through its addressing and distribution unit to the converter units that have registered for these operational data.

The converter unit may be programmed monolithically or split into different levels. In accordance with yet a further advantageous mode of the method of the invention, expediently, the converter unit includes an outer connecting unit and an intermediate matching unit, which is thus disposed between the outer connecting unit and the central data distributor. The connecting unit expediently converts the component protocols of the main system components into the system-internal data protocol or converts the data from the system-internal data protocol into the component protocols. By contrast, the intermediate matching unit advantageously converts the operational data from component formats of the main system components into a system-internal data format or from the system-internal data format into one of the component formats of one of the main system components. The connecting unit and the matching unit may be combined in a single piece of hardware and provided as program units. The same applies to the entire central integration module, in the case of which the individual units are program units.

In the case of complex data processing operations, a situation may arise in which electromagnetic interference, computation errors, component faults or other difficulties corrupt data, as a result of which there is the possibility of incorrect operational commands being output to a main system component. In accordance with yet an added advantageous mode of the method of the invention, in order to avoid this, the central integration module expediently includes a data checking unit that accepts original data from a main system component and adds a signature, for example a fingerprint, an identifier, such as a hash value, to the data and forwards them in the direction of the central data distributor. Expediently, the data checking unit also checks converted data coming from the direction of the central data distributor for consistency with the original data having the same signature. Using a signature check, the data checking unit can associate the converted data with the original data that are expediently stored in the data checking unit and can check the data for consistency, that is to say for correspondence. In particular, the data checking unit can provide critical functions concerning the conversion of the data in the central data distributor redundantly and, for the purpose of checking consistency, can subject the original data likewise to conversion using the redundantly provided "conversion" functions in order to be able to compare the original data with the data converted through the data distributor or at least to be able to increase the comparability of the data. If there is an inconsistency, the data checking unit can output an error function. The error function can interrupt the forwarding of the data to the main system component, can send a piece of error information about the error that has arisen to the tactical operation control and/or can initiate another measure that prevents execution of an erroneous command. This allows system integrity to be increased. In particular, unwanted combat actions can be avoided, such as an unwanted change of target and/or an erroneous friend/foe distinction.

With the objects of the invention in view, there is concomitantly provided a ground-based anti-aircraft system having a group of main system components that contains a sensor system, a tactical operation control and an effector system.

It is proposed that the ground-based anti-aircraft system has, according to the invention, a central integration module to which the main system components are connected in star form. The central integration module is expediently prepared for central data distribution from and to the main system components. The central integration module has a converter unit and a central data distributor that are connected to one another, and embodied, in such a way that the data from the main system components to the data distributor and from the data distributor to the main system components pass through the converter unit in each case.

Expediently, the converter unit and the central data distributor are constructed in such a way that the data are converted in the converter unit from data protocols of the main system components into a system-internal data protocol or from the system-internal data protocol into the data protocols of the main system components.

The description provided heretofore for advantageous embodiments of the invention contains numerous features that are reproduced in the individual subclaims in a manner which is combined in part to form a plurality of features. These features can expediently also be considered individually, however, and combined into useful further combinations. In particular, these features can each be combined individually and in any suitable combination with the method according to the invention and the apparatus according to the invention based on the independent claims.

The properties, features and advantages of the invention that are described above and also the manner in which they are achieved will become clearer and more distinctly comprehensible in connection with the description that follows for the exemplary embodiments, which are explained in more detail in connection with the drawings. The exemplary embodiments are used to explain the invention and do not limit the invention to the combination of features that is indicated therein, not even in reference to functional features. Furthermore, features of each exemplary embodiment that are suitable therefor can also be considered in explicit isolation, removed from an exemplary embodiment, introduced into another exemplary embodiment in order to augment it and/or combined with any of the claims.

DETAILED DESCRIPTION OF THE INVENTION

Figure 1:
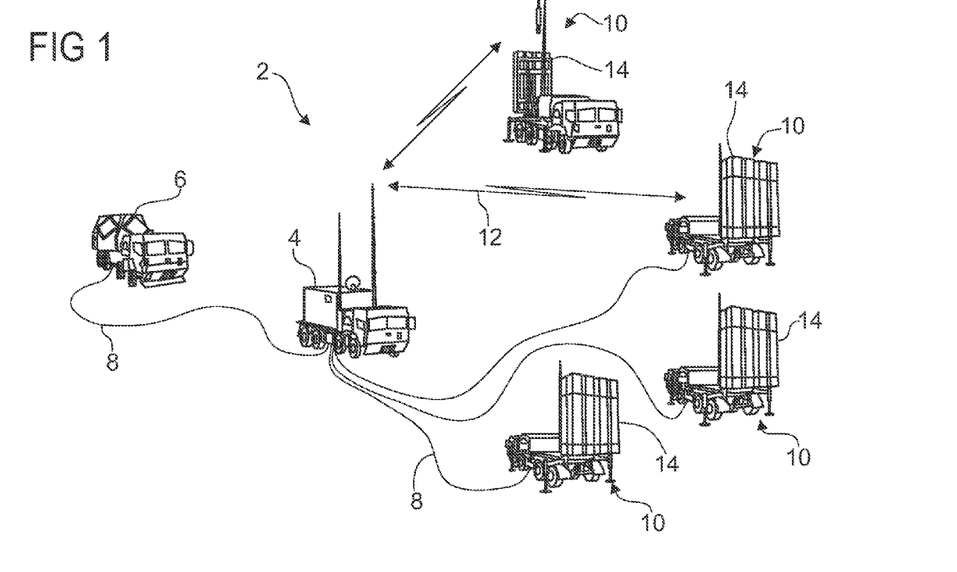
FIG. 1 is a diagrammatic, perspective view of a ground-based anti-aircraft system having a group of main system components, such as a radar system, a tactical operation control and four effector systems for combating air targets.

Referring now to the figures of the drawings in detail and first, particularly, to FIG. 1 thereof, there is seen a ground-based anti-aircraft system 2 which is formed of a series of vehicles that are connected to one another for the purpose of information interchange. The anti-aircraft system 2 includes a tactical operation control 4 in a container that is mounted on a vehicle and that is connected to a sensor system 6 through a data cable 8. The sensor system 6 is a radar tracking system that is used to track aircraft sensed by the radar and capture the target data from the aircraft. The target data or sensor data may be the direction of flight, the speed of flight and/or the current position of the tracked aircraft, the target data being continually captured and updated. The target data are transmitted to the tactical operation control 4 through the data cable 8.

In the tactical operation control 4, these operative data are processed to form deployment data or deployment commands that are passed to one or more of four effector systems 10 of the anti-aircraft system 2 that are provided. Furthermore, deployment commands are also passed to the sensor system 6, for example whether an aircraft is intended to continue to be monitored, how continuously the target data are intended to be updated, or the like. The effector systems 10 are connected to the tactical operation control 4 either through a data cable 8 or through a radio link 12 and receive the deployment commands received from the tactical operation control 4 and execute the commands. To this end, each effector system 10 has a respective launcher device having a number of canisters 14 that each contain an anti-aircraft missile, the canisters being equipped with an integrated firing apparatus for starting the anti-aircraft missile. Such an anti-aircraft missile can be started from its canister 14 by a corresponding deployment command and then flies to the aircraft sensed by the sensor system 6 and combats the aircraft.

Deployment data about deployment statuses of the effector systems 10, such as the status of combat readiness, executed firing of an anti-aircraft missile, a position and an orientation of an effector system 10 and the like, are passed to the tactical operation control 4 by the relevant effector system 10 through the radio link 12 or the data cable 8 in order to be taken into account for the output of further deployment commands.

After an anti-aircraft missile has been fired, it is controlled by the tactical operation control 4 or directly by the sensor system 6 through a radio link. Control is also possible from the effector system 10. This is accomplished using the target data captured by the sensor system 6, and the anti-aircraft missile is steered in the direction of the target. Once the anti-aircraft missile has come so close to the target for combat that its seeker head has sensed the target itself, control of the anti-aircraft missile is undertaken by its own seeker head. Up until then, the anti-aircraft missile is controlled by the target data from the sensor system 6, either from the tactical operation control 4 or directly by the sensor system 6, possibly through an antenna of the firing effector system 10.

In order to control the effector systems 10 and the sensor system 6, the tactical operation control 4 includes a central control unit, also called a sensor fire and weapon control (SFWC). This control unit outputs the deployment commands to the effector systems 10 and the sensor system 6. For this purpose, it processes the data from the sensor system 6, particularly the target data, the deployment data from the individual effector systems 10 and input data from a fire control station that have been input into the tactical operation control 4 by a user or that have been sent to the tactical operation control 4 by another control station, for example through a radio link.

Figure 2:
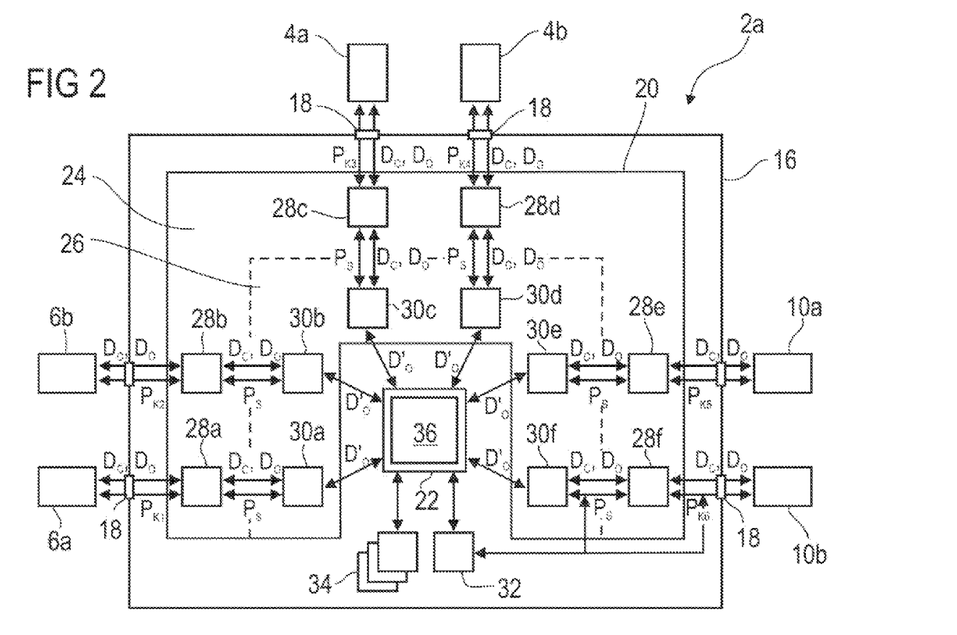
FIG. 2 is a schematic diagram of a central integration module that is connected to the main system components of FIG. 1 in star form.

FIG. 2 shows a further anti-aircraft system 2a in a schematic illustration. The anti-aircraft system 2a has a nearly identical construction to the anti-aircraft system 2 of FIG. 1 with the difference that the sensor system 6 of FIG. 1 is provided twice in the configuration of FIG. 2, namely once as a sensor system 6a and once as a sensor system 6b. With respect to the reference symbols in the drawings and the description, it can be observed that components that are the same in FIG. 1 and FIG. 2 but that have minor differences, for example in terms of dimension, position and/or function, are denoted by the same reference numerals. If the reference numeral is mentioned on its own without a reference letter, as indicated in FIG. 1, for example, then the corresponding components are referred to in a generalized manner, which means that what is said in relation to the sensor system 6 from FIG. 1 applies to both sensor systems 6a and 6b of FIG. 2, for example.

The tactical operation control 4a, 4b is also provided in redundant form, the two tactical operation controls 4a, 4b, like the two sensor systems 6a, 6b, coming from different manufacturers, that is to say possibly being very similar in terms of operation but possibly being of slightly different construction. By way of example, it may be the case that different sensor systems 6a, 6b and different tactical operation controls 4a, 4b from different nations are interconnected in an anti-aircraft system 2a. This may be advantageous in the case of international military exercises, or may be advantageous when using components from different manufacturers in an anti-aircraft system 2a.

The two effector systems 10a, 10b shown in FIG. 2 likewise come from different manufacturers. For the sake of clarity, only two effector systems 10a, 10b are shown, but—as FIG. 1 shows—there may also be further effector systems 10a provided in the anti-aircraft system 2a.

The tactical operation controls 4, the sensor systems 6 and the effector systems 10 form the main system components of the anti-aircraft system 2. They are each connected to one another not directly but rather only indirectly through a central integration module 16, through which the main system components are connected to one another in star form. The integration module 16 may be provided separately or may be integrated in one of the tactical operation controls 4, with the integration module 16 being provided in addition to the central control unit of the tactical operation control 4. Thus, the central integration module 16 may be provided as a separate physical unit in a container of one of the tactical operation controls 4, for example. The data cables 8 or the radio links 12 are then connected to the integration module 16 rather than, as customary previously, directly to the central control unit of the tactical operation control 4, since the latter is also only indirectly connected to the other main system components through the integration module 16.

For each of the main system components, the central integration module 16 has a respective interface 18 embodied as hardware, for example in the form of a plug connection for plugging in a connector of the respective main system component.

In terms of construction, the central integration module 16 is split into an outer region and an inner region. The outer region is a converter unit 20 and the inner region is a central data distributor 22. The converter unit 20 is in turn divided into an outer region and an inner region, as indicated by a dashed line in FIG. 2. The outer region is a connecting unit 24 and the inner region is a matching unit 26. The connecting unit 24 includes a connecting element 28a-f for each main system component, and the matching unit 26 includes a matching element 30a-f for each of the main system components. Furthermore, the inner region of the central integration module 16 includes a data checking unit 32 and a number of core functions 34 which are combat functions for target combat.

Each of the main system components delivers both operational data $D_O$ and control data $D_C$ during operation. The operational data $D_O$ contain data relevant to air defense that come and are sent from and to other main system components. By contrast, the control data $D_C$ are data that are used for controlling the corresponding main system components, and that are irrelevant to the other main system components. Both data types are interchanged through the interfaces 18.

Furthermore, each main system component sends and receives its data in a data protocol $P_K$ that may be individually matched to the main system component. The data to be received from the main system component thus need to be sent to the main system component in this data protocol.

One task of the connecting unit 24 is to convert the data protocols $P_K$ of the main system components into a standard system protocol $P_S$. The data that are input into the matching unit 26 from the inside and received from the matching unit are thus basically sent and received in the system-inherent system protocol $P_S$. Accordingly, each connecting element 28a-f is constructed to convert the individual component protocol $P_K$ into the general system protocol $P_S$. By way of example, the connecting element 28a is thus programmed to convert the component protocol $P_{K1}$ of the sensor system 6a into the system-inherent system protocol $P_S$. Naturally, when being sent to the main system component, the data are converted back from the system-internal protocol $P_S$ into the corresponding component protocol $P_K$, into the component protocol $P_{K1}$ in the example shown, by the relevant connecting element 28a-f.

In the matching unit 26, the operational data $D_O$ are isolated from the control data $D_O$. The control data $D_C$ from the main system components thus only get as far as the matching element 30 associated therewith rather than further to the central data distributor 22. Exclusively the operational data $D_O$ are forwarded to the latter and received from the latter.

In addition to this data-isolating function of the individual matching elements 30, each of the matching elements 30 is equipped with a control function for the purpose of controlling the main system component associated with the matching element. The main system component is thus controlled from the associated matching element 30, which contains the programming or software and hardware necessary therefor. Each of the main system components thus has precisely one connecting element 28 and precisely one matching element 30 directly associated with it, which are used for protocol conversion or data isolation and control of the main system component and are prepared therefor.

Furthermore, the matching elements 30 are attributed the task of converting the operational data $D_O$ from the component format into a system-internal data format or from the system-internal data format into the component format. This is indicated in FIG. 2 by virtue of the operational data $D'_O$ interchanged between the central data distributor 22 and the matching elements 30 being provided with a primed reference symbol. In this way, it is possible to compensate for differences in units of measure, in coordinate systems or in relative reference variables, so that the operational data $D'_O$ in the central data distributor 22 are interchanged only in standardized form with respect to their format too.

The operational data $D_O$ are distributed by the central data distributor 22. To this end, the latter includes an addressing and distribution unit 36 that addresses the operational data $D_O$ to that main system component that requires the operational data $D_O$. To this end, the addressing and distribution unit 36 includes an association between the type of the operative data $D_O$ and the main system components, so that it is clear just from the type or the class of the data where the data come from and for whom the data are intended. Alternatively, the data distributor 22 may include, in addition to an addressing and distribution unit 36, a registration unit that interacts with the addressing and distribution unit 36 and in which the matching elements 30 can register for the type of operative data $D_O$ that their main system component needs. For this purpose, the addressing and distribution unit expediently includes an association between the data and a type. The data for which a matching element 30 is registered can therefore be addressed to the associated main system component. In a further alternative, it is possible to dispense with the addressing and distribution unit 36 if the addressing function is integrated into the matching elements 30 or if the matching elements 30 are capable of independently searching the generally available pool of operational data $D_O$ for those data that are relevant to their main system component.

In addition, it is also possible, as a variant for what has been described above, to relocate the control function for controlling the corresponding main system component from the matching element 30 into the corresponding connecting element 28. The main system components are then thus controlled by the connecting unit 24 or its individually associated connecting elements 28. In that case, it is also advantageous if the isolation of the control data $D_C$ from the operational data $D_O$ takes place in the relevant connecting elements 28.

The data checking unit 32 is used to check the integrity of the data interchanged between the main system components. To this end, the data checking unit 32 is capable of picking off both the data interchanged between the main system component and the connecting element 28 and the data interchanged between the connecting element 28 and the matching element 30, and also the data passed to and sent by the central data distributor 22. This is indicated in FIG. 2 only by the corresponding arrows for the data line between the effector system 10*b* and the central data distributor 22. The connection for the data lines from the other main system components to the central data distributor 22 exists in the same way and has been omitted from the drawing merely for the sake of clarity.

The data checking unit 32 adds to the data coming from the corresponding main system component a signature that is characteristic of the data. When data leave a component 22, 28, 30, these outgoing data are checked using the signature in order to establish data consistency. If one or more bytes have been undesirably altered or erased by transmission errors, for example, such a transmission error can be recognized by checking the signature with the outgoing data. In addition, the data checking unit 32 includes system-critical functions relating to the conversion of the data in the central data distributor 22 and/or in the components 28, 30 in redundant form in order to be able to subject the data coming from the main system component to the same or at least partly the same conversion as in the data distributor 22 and/or the components 28, 30, in order to facilitate the check for consistency and, in particular, to be able to recognize systematic errors. When such data inconsistency is recognized, the data checking unit 32 has veto authority for the deployment commands, so that the deployment commands can be blocked and do not reach the corresponding main system component that they should have reached. In this way, erroneous operations of the effector systems 10 can be avoided.

The text below provides several examples of the operation of the central integration module 16.

In a first exemplary embodiment, the target data from a sensor manufacturer A of the sensor system 6*a* contain, inter alia, the position of a target in local coordinates relative to the sensor position. To this, it should be added that a sensor system 6 has an internal reference system relative to which the position of the sensed aircraft is indicated. However, the orientation of the reference system relative to fixed geostationary coordinates is dependent on the orientation of the vehicle on which the sensor system 6 is installed. The data format of the operational data $D_O$ from the sensor system 6*a* is thus a local data format. The data format must first of all be converted into a, by way of example, geostationary and hence general data format, so that the operational data $D'_O$ are then available in the system-internal data format. One possibility would be for the target data to be provided in so-called earth centered, earth fixed (ECEF) data.

Conversely, the operational data $D'_O$ are converted back into the local component format of the receiving main system component on the path to a main system component. Should an effector system 10 expect inherently local target data relative to the canister position, for example, the corresponding matching element 30*e*, 30*f* at the effector system 10*a*, 10*b* would convert the target data from the general system-internal data format $D'_O$ into the local data format $D_O$ and provide them for the corresponding effector systems 10*a*, 10*b* through the connecting element 28*e*, 28*f*.

In a further example, the radar system 6*b* also delivers a measure of the accuracy of the target data for the target data, such as position, speed and direction of travel. In this example, this is meant to be a value between 0 and 20, with 20 being the highest possible accuracy of the radar system 6*b*. A possible adaptation for the use of the accuracy within the central data distributor 22 would be the provision of the accuracy using an error covariance matrix. To this end, the associated matching element 30*b* requires further specific performance parameters from the radar system 6*b*, which are provided for the corresponding matching element 30*b* by using a configuration file, for example. The matching element 30*b* then adds the error covariance matrix to the operational data $D'_O$.

It is also assumed that the relevant tactical operation control 4*b* for its part expects a standardized Link 16 track quality, which normally uses a value between 0 and 15, for the measure of the accuracy. The corresponding matching element 30*d* for the tactical operational control 4*b* can then convert the error covariance matrix into the track quality of Link 16 in a simple manner and transmit it to the tactical operation control 4*b* through the connecting element 28*d*.

In a further example, the sensor system 6*a* has internal monitoring of its technical state. This monitoring produces status information, such as temperatures of the components, filling levels of resources, and so on, and provides the information on its interface 18. The transmission protocol used for this external interface 18 is a special network protocol from the manufacturer of the sensor system 6*a*. The relevant connecting element 28*a* converts the technical standards on which the special network protocol is based and converts the detailed status information, that is to say control data $D_C$, for a generic messaging system that is used within the connecting unit 24. The associated matching element 30*a* receives the detailed status information on the basis of the generic messaging system and combines this detailed information specific to the sensor 6*a* and produces the system-relevant information that the sensor 6*a* is ready for use. This readiness for use is forwarded to the central data distributor 22 as operational data $D'_O$.

The system-relevant information that the sensor 6*a* is ready for use is provided on the main system components through the central data distributor 22. Since the information about the sensor status is of interest to the user of the ground-based air defense system 2 in tactical operation control 4*b*, it is accepted by the matching element 30*b* in the generic messaging system format. Since the status information within the main system components is split into identical categories in this example, there is no need for any procedural matching to be performed, which means that the data format can remain the same. The corresponding connecting element 28*c* converts the status information from the sensor 6*a*, namely the readiness for use, into the technical specifics of the tactical operational control 4*a*, in this example from the generic messaging system to the communication standard on which the special network protocol from the manufacturer of the tactical operation control 4*a* is based, which is used for the interface 18 to the tactical operation control 4*a*. The tactical operation control 4*a* has the system-relevant information that the sensor 6*a* is ready for use in the required data format and in the required data protocol.

In a further exemplary embodiment, the main system component sensor system 6*b* establishes the position of an object in flight and senses the position in the so-called north east down coordinate system NED and provides these operational data $D_O$ on its interface 18. The relevant connecting element 28*b*, which implements the technical specifics of the interface in accordance with the component protocol of the sensor system 6*b*, accepts these position data and converts them into the generic messaging format. There is now abstraction from the technical specifics of the component protocol of the sensor system 6*b*.

The matching element 30*b* then takes delivery of the position information and converts the position information from the NED coordinate system into the ECEF coordinate system. Hence, abstraction from the procedural property that the sensor provides positions in the local coordinate system has been performed. The position data are then available in the system-internal data format of the central data distributor 22. They are relevant to the operation of the ground-based air defense system 2 as operational data D'$_O$. In order to be able to work with an effector system 10, these operational data D'$_O$ are converted from the system-internal data format, specifically by the associated matching element 30e, 30f of the corresponding effector system 10a, 10b. Since the effector system 10a, 10b needs the position data in a local coordinate system, the data are converted from the system-internal data format into position data in the local coordinate system, and these data are forwarded to the interface 18 through the connecting element 28e, 28f.

Furthermore, the connecting element 28e, 28f receives the local position data and transfers them to the local protocol P$_{K5}$, P$_{K6}$ of the effector system 10a, 10b. In this case, the connecting element 28e, 28f implements the technical specifics of the serial interface of the effector system 10a, 10b. The effector system 10a, 10b receives the position data in the local coordinate system on its existent serial interface and can process them further internally.

The invention claimed is:

1. A method for operating a ground-based anti-aircraft system, the method comprising the following steps:
   providing a group of main system components containing a sensor system, a tactical operation control and an effector system;
   passing sensor data about a target for combat from the sensor system to the tactical operation control, processing the sensor data in the tactical operation control, passing the sensor data in processed form from the tactical operation control to the effector system, and using the sensor data in the effector system to combat the target;
   providing a central integration module having a converter unit and a central data distributor;
   using the converter unit to route data from all of the main system components to the central data distributor;
   converting the data in the converter unit from a component protocol into a system-internal data protocol;
   passing the data again through the converter unit from the central data distributor to one or more of the main system components;
   using the converter unit to convert the distributed data back from the system-internal data protocol into a component protocol; and
   using the converter unit to isolate control data and operational data being present in a data stream from a main system component from one another and to forward only operation data to the central data distributor.

2. The method according to claim 1, which further comprises providing the converter unit with a dedicated converter element for each respective main system component, and using the converter element to convert the data from and to the respective main system component.

3. The method according to claim 1, which further comprises using the converter unit to control the main system components based on the operational data coming from at least one of the central data distributor or the main system component.

4. The method according to claim 1, which further comprises using the converter unit to convert operational data received from a main system component from a component format into a system-internal data format and to forward the operational data to the central data distributor in the system-internal data format.

5. The method according to claim 1, which further comprises using the converter unit to filter the data being relevant to a main system component from the data being provided in the central data distributor generally.

6. The method according to claim 1, which further comprises providing the converter unit with an outer connecting unit converting component protocols of the main system components into system-internal data protocol or from the system-internal data protocol into the component protocols, and an intermediate matching unit converting operational data from component formats of the main system components into a system-internal data format or from the system-internal data format into the component formats.

7. The method according to claim 1, which further comprises providing the central integration module with a data checking unit accepting original data from a main system component, adding a signature to the data and forwarding the data in a direction of the central data distributor, and checking the data coming from the direction of the central data distributor for consistency with original data by using a signature check.

8. A method for operating a ground-based anti-aircraft system, the method comprising the following steps:
   providing a group of main system components containing a sensor system, a tactical operation control and an effector system;
   passing sensor data about a target for combat from the sensor system to the tactical operation control, processing the sensor data in the tactical operation control, passing the sensor data in processed form from the tactical operation control to the effector system, and using the sensor data in the effector system to combat the target;
   providing a central integration module having a converter unit and a central data distributor;
   using the converter unit to route data from all of the main system components to the central data distributor;
   converting the data in the converter unit from a component protocol into a system-internal data protocol;
   passing the data again through the converter unit from the central data distributor to one or more of the main system components;
   using the converter unit to convert the distributed data back from the system-internal data protocol into a component protocol; and
   using the converter unit to isolate control data and operational data being present in a data stream from a main system component from one another and to forward only operational data to the central data distributor.

9. A method for operating a ground-based anti-aircraft system, the method comprising the following steps:
   providing a group of main system components containing a sensor system, a tactical operation control and an effector system;
   passing sensor data about a target for combat from the sensor system to the tactical operation control, processing the sensor data in the tactical operation control, passing the sensor data in processed form from the tactical operation control to the effector system, and using the sensor data in the effector system to combat the target;
   providing a central integration module having a converter unit and a central data distributor;
   providing the central data distributor with an addressing and distribution unit addressing operational data accepted and converted from one main system component to another main system component;

using the converter unit to route data from all of the main system components to the central data distributor;

converting the data in the converter unit from a component protocol into a system-internal data protocol;

passing the data again through the converter unit from the central data distributor to one or more of the main system components; and using the converter unit to convert the distributed data back from the system-internal data protocol into a component protocol.

10. A ground-based anti-aircraft system, comprising:

a group of main system components containing a sensor system, a tactical operation control and an effector system;

a central integration module to which said main system components are connected in star form;

said central integration module being prepared for central data distribution from and to said main system components; and said central integration module having a converter unit and a central data distributor being connected to one another and configured to pass data from said main system components to said data distributor and from said data distributor to said main system components through said converter unit and to convert the data in said converter unit from data protocols of said main system components into a system-internal data protocol or from the system-internal data protocol into the component protocols of said main system components, said converter unit isolating control data and operational data being present in a data stream from a main system component from one another and to forward only operation data to said data distributor.

* * * * *